Patented Sept. 17, 1935

2,014,504

UNITED STATES PATENT OFFICE 2,014,504

CHLORINATED RUBBER

Ludwig Orthner, Leverkusen-I. G. Werk, Wilhelm Becker, Cologne-Mulheim, and Leo Rosenthal, Leverkusen-Wiesdorf, Germany, assignors to I. G. Farbenindustrie Aktiengesellschaft, Frankfort-on-the-Main, Germany No Drawing. Application March 24, 1932, Serial No. 601,048. In Germany March 30, 1931

3 Claims. (Cl. 260—1)

This invention relates to a process of preparing chlorinated rubber, and, in particular, relates to the treatment of rubber solutions with chlorine.

It is known that rubber can be transformed into chlorine derivatives by treating it with chlorine under various conditions, for example, while in solution with suitable organic solvents. When working according to these known methods, chlorinated rubbers are obtained, which are rather unstable, meaning that they split off hydrochloric acid after a short time and at rather low temperatures.

The object of the present invention is to provide a method of preparing chlorinated rubbers, which are completely stable at normal temperature and which are substantially more stable at elevated temperature than the known chlorinated rubbers.

The process of the manufacture of our chlorinated rubbers is carried out by dissolving rubber in a solvent therefor and chlorinating it in this solution in the presence of an acid binding agent, which does not react with chlorine, such as alkali- and earthalkali metal carbonates or bicarbonates, earthalkali metal oxides or hydroxides, magnesium oxide, sodium acetate etc. As solvents we prefer such ones as are indifferent to the starting materials and to chlorine, such as tetrachloromethane, chloroform, tetrachloroethane, hexachloroethane, ethylenechloride, methylenechloride etc.

The chlorinating reaction may be performed at normal or even lower or higher temperatures and at normal or superatmospheric pressure. As chlorinating agent we prefer chlorine, which, advantageously, is caused to bubble into the reaction mixture in the gaseous state.

When performing the reaction at a temperature below 50° C., it will be necessary to heat the reaction mixture after the chlorinating process is complete to somewhat higher temperatures in order to obtain stable products. The time during which this heating should be continued varies within wide limits, mainly depending on the temperature applied. According to a preferred method of working we perform the chlorinating process at a temperature between about 10–40° C. and then heat the reaction mixture to about 60–90° C. for about 2 to 10 hours. When heating the chlorinated rubber solutions only to about 50–55° C., stable products are also obtainable at prolonged heating. Higher temperatures yield likewise stable products in a short time, but in this case the reaction products frequently become somewhat colored.

When working in the manner above described, chlorinated rubbers can be obtained with a chlorine content of between 45–70% which differ in their properties to some degree. However, all the new reaction products possess the property to be completely stable at normal temperature and to be substantially more stable at higher temperatures than the chlorinated rubbers hitherto known. For example, according to our process chlorinated rubbers can be obtained, which do not split off any hydrochloric acid when dissolved in xylene and heated to 100° C. for about 10–15 hours, whereas the known chlorinated rubbers will generally split off hydrochloric acid in xylene solution at 100° C. within ¼ to 1 hour or even in less time.

As mentioned above, according to our process chlorinated rubbers of various chlorine contents can be obtained, and it should be pointed out that the amount of the acid binding agent used is advantageously adapted to the degree of the chlorination of the rubber, or in other words, to the amount of chlorine, which is introduced into the reaction mixture calculated on the rubber applied. The more chlorine is used, the more of the acid binding agent should be applied. Generally, 2–5 parts by weight on one part by weight of rubber will yield good results.

The best products we have obtained according to our process were those, which were prepared by introducing chlorine into a 4–10% solution of rubber in a solvent of the kind above referred to, preferably tetrachloromethane, at a temperature between about 10–40° C. in the presence of 3 to 4 parts by weight of sodium- or potassium-carbonate or bicarbonate on one part of rubber, until the rubber contains about 55–65% of chlorine, and then heating the reaction mixture to about 70–80° C. for several hours. Otherwise, the chlorinating reaction may be performed at temperature surmounting about 50° C., whereby stable chlorinated rubbers are obtained directly. However, as mentioned above, we prefer to chlorinate the rubber first at lower temperatures, and thereafter to heat the reaction mixture at a temperature above 50° C.

In the appended claims the term "rubber" is intended to include rubber as it is marketed, for example, in form of crepe, smoked sheets, etc. as well as disaggregated rubber, as it is obtainable, for example, by strongly masticating rubber, or by heating and/or oxidizing it according to known methods etc. Likewise, the compounds closely related to rubber, such as balata, guttapercha, reclaimed rubber etc. are within the scope of the term "rubber".

The following examples illustrate the invention, without limiting it thereto, the parts being by weight:—

Example 1

A solution of masticated pale crepe or smoked sheets in tetrachloromethane of 5–10% rubber content is prepared. To this solution 300–400 parts of an alkali metal bicarbonate, such as sodium or potassium bicarbonate are added on each 100 parts of rubber contained in the solution. A current of chlorine is then bubbled through the solution at a temperature of 10–15° C., while stirring, until a chlorinated rubber of 40–70% chlorine content has formed. Then, the reaction mixture is heated for 2 to 3 hours at its boiling point. After cooling, the reaction mixture is filtered, and the filtrate is evaporated, or the chlorinated rubber having formed is precipitated by means of methyl- or ethylalcohol. The reaction product is thus obtained in a stable and nearly colorless form. It is easily soluble in benzene, toluene, xylene etc. and is completely stable in the solid state as well as in solution at normal temperature.

Example 2

A 5% solution of rubber in tetrachloromethane is chlorinated as described in Example 1 in the presence of 190–250 parts of calcium oxide in each 100 parts of rubber present in the solution. After heating of the reaction mixture at its boiling point for about 5 hours a stable chlorinated rubber is likewise obtained.

Due to their properties, the chlorinated rubbers above described may be used, for example, for coating compositions, which may contain, besides the chlorinated rubber and the respective solvent, softeners, drying oils, filling materials, pigments etc.

In the above examples the tetrachloromethane may be replaced, for example, by tetrachloromethane, hexachloroethane, methylenechloride, ethylenechloride etc. Likewise, instead of the alkali metal bicarbonates or the calcium oxide other acid binding agents being inert to the starting materials and to chlorine may be applied, such as calcium- or barium hydroxide, sodium or potassium carbonate, calcium-, magnesium- or strontium oxide, -hydroxide or -carbonate may be used.

We claim:—

1. The process which comprises dissolving rubber in a solvent therefor, which solvent is inert to the starting materials and to chlorine, adding an acid binding agent to the solution, which is not attacked by chlorine, and chlorinating the rubber contained in the solution by means of chlorine, care being taken that the temperature surmounts about 50° C. during or after the chlorinating process.

2. The process which comprises dissolving rubber in a solvent therefor, which solvent is inert to the starting materials and to chlorine, adding an acid binding agent to the solution, which is not attacked by chlorine, leading a current of gaseous chlorine through the solution at about 10–40° C., until the rubber contains between about 40–70% of chlorine, and then heating the reaction mixture to a temperature above about 50° C. for severals hours.

3. The process which comprises preparing a 5 to 10% rubber solution in tetrachloromethane, adding about 300–400 parts by weight of an alkali metal bicarbonate on each 100 parts by weight of rubber present in the solution, leading a current of gaseous chlorine through the solution at a temperature of between about 10–40° C., until the rubber present contains between about 40–70% of chlorine, and then heating the reaction mixture to the boiling point for 2–3 hours.

LUDWIG ORTHNER.
WILHELM BECKER.
LEO ROSENTHAL.